(12) United States Patent
Tsao et al.

(10) Patent No.: US 6,603,559 B2
(45) Date of Patent: Aug. 5, 2003

(54) SILICON-ON-INSULATOR OPTICAL WAVEGUIDE MICHELSON INTERFEROMETER SENSOR FOR TEMPERATURE MONITORING

(75) Inventors: Shyh-Lin Tsao, Hsin-Tien (TW); Shin-Ge Lee, Tao-Yuan (TW); Peng-Chun Peng, Chung-Ho (TW); Ming-Chun Chen, Chung-Li (TW)

(73) Assignee: Yuan Ze University, Chung-Li (TW)

( * ) Notice: Subject to any disclaimer, the term of this patent is extended or adjusted under 35 U.S.C. 154(b) by 37 days.

(21) Appl. No.: 09/973,686

(22) Filed: Oct. 11, 2001

(65) Prior Publication Data

US 2003/0072005 A1 Apr. 17, 2003

(51) Int. Cl.[7] .................................................. G01B 9/02
(52) U.S. Cl. ....................................................... 356/479
(58) Field of Search ................................ 356/477, 479; 250/227.19, 227.27; 385/12, 14

(56) References Cited

U.S. PATENT DOCUMENTS 5,953,472 A * 9/1999 Boschis et al. ................ 385/37
6,137,565 A * 10/2000 Ecke et al. ................. 356/35.5

OTHER PUBLICATIONS

Ang, T.W. et al. "Effects of Grating Heights on Highly Efficient Unibond SOI Waveguide Grating Couplers". Jan. 2000, IEEE Photonics Technology Letters, vol. 12, No. 1, p. 59–61.*

* cited by examiner

*Primary Examiner*—Samuel A. Turner
*Assistant Examiner*—Michael A. Lyons
(74) *Attorney, Agent, or Firm*—Bacon & Thomas, PLLC

(57) ABSTRACT

A high accurate SOI optical waveguide Michelson interferometer sensor for temperature monitoring combines a waveguide coupler, waveguide, or splitter with two silicon-on-insulator Bragg gratings.

10 Claims, 5 Drawing Sheets

SILICON-ON-INSULATOR OPTICAL WAVEGUIDE MICHELSON INTERFEROMETER SENSOR FOR TEMPERATURE MONITORING

FIELD OF THE INVENTION

The present invention relates to a temperature sensor, and more particularly to a Michelson interferometer temperature sensor by combining a silicon-on-insulator waveguide coupler with two silicon-on-insulator waveguide Bragg gratings.

BACKGROUND OF THE INVENTION

According to the present developments of the optical sensor, the fiber Bragg grating is still one of the major components for providing physical measurements. But the manufacturing time of the fiber Bragg grating is longer than that of the semiconductor grating, and the yield thereof is less than that obtained using semiconductor techniques. In addition, the size of the fiber Bragg grating is larger than that of the semiconductor waveguide, and thus the cost cannot be reduced.

Since the optical fiber communication network develops very fast, each reliable subscriber needs many highly accurate optical sensors built in key components. Developing low cost optical waveguide sensors based on the semiconductor manufacturing process will therefore be a trend in related fields.

Silicon is very easy to acquire and very cheap, and has been the major material in the IC manufacturing process, so the present invention uses silicon-on-insulator as the substrate. The advantages of high bandwidth and low power loss of MOSFET based on silicon-on-insulator lead it to be the best choice for the future OEIC (Optoelectronic Integrated Circuit).

The present invention applies the technology of IC semicoductor manufacturing process to the field of optical sensor to reduce the size of the component significantly.

DESCRIPTION OF THE PRIOR ART

A. D. Kersey and T. A. Berkoff disclosed in IEEE Photonics Technology Letters, vol. 4, no. 10, 1992, page 1183~1185 that the fiber Bragg grating was used as a temperature sensing component, having an accuracy of 0.05° C. That result proved the feasibility of using Bragg grating as a temperature sensor. But the manufacturing cost is too high, and the effect is not so good as the temperature sensor of the present invention designed by using silicon-on-insulator waveguide grating.

Wei-Chong Du, Xiao-Ming Tao and Hwa-Yaw Tam disclosed in IEEE Photonics Technology, vol. 11, no. 1, 1999, page 105~107 that the reflective spectrum of the fiber Bragg grating was used to analyze the variation of the temperature. However, the present invention uses two reflective gratings and Michelson interferometer effect to reduce reflective spectrum linewidth and achieve a more accurate temperature monitoring.

A. D. Kersey and T. A. Berkoff disclosed in IEEE Photonics Technology Letters, vol. 8, no. 9, 1996, page 1223–1225 that the fiber Bragg grating was successfully used as a temperature and pressure sensor, but the cost can't be reduced. The present invention utilizes the semiconductor technology to lower the cost.

T. W. Ang, G. T. Reed, A. Vonsovici, A. G. R. Evans, P. R. Routley and M. R. Josey disclosed in IEEE Photonics Technology Letters, vol 12, no. 1, 2000, page 59~61 that the effect of the silicon-on-insulator waveguide grating was analyzed, and proved the feasibility of the silicon-on-insulator waveguide grating sensor.

Eric Udd disclosed in U.S. Pat. No. 5,591,965 (1997) that a sensor system was designed by a plurality of fiber gratings, and therefore proved the feasibility of multiplex physical measurement by fiber grating. However, the present invention does not use the periodic fiber grating shown in U.S. Pat. No. 5,591,965, but rather utilizes a semiconductor manufacturing process for commercialization.

Mark F. Krol disclosed in U.S. Pat. No. 96,075,907 (2000) that a plurality of fiber gratings of long period were arranged in a fiber network for monitoring the physical quantities of many points, such as temperature . . . and so on. U.S. Pat. No. 96,075,907 proved that an optical temperature sensor is very useful in fiber network, but the technology thereof is different from the present invention.

Stephen James Crampton, Arnold Peter Rosc and Andrew George Rickman disclosed in U.S. Pat. No. 5,757,986 (1998) that an optical modulating component was designed using a silicon-on-insulator waveguide, proving that the silicon-on-insulator waveguide is very useful and marketable.

OBJECT OF THE INVENTION

The present invention provides a Michelson interferometer temperature sensor including a 2×2 waveguide coupler and two waveguide Bragg gratings based on silicon-on-insulator substrate. The temperature can be read out through the sensor. The temperature variation can induce the wavelength response variation which results in the power variation. Since the thermal-optical expansion coefficient of the silicon-on-insulator is higher than that of a fiber, it can enhance the reslution of temperture measurement significantly.

Figure 1:
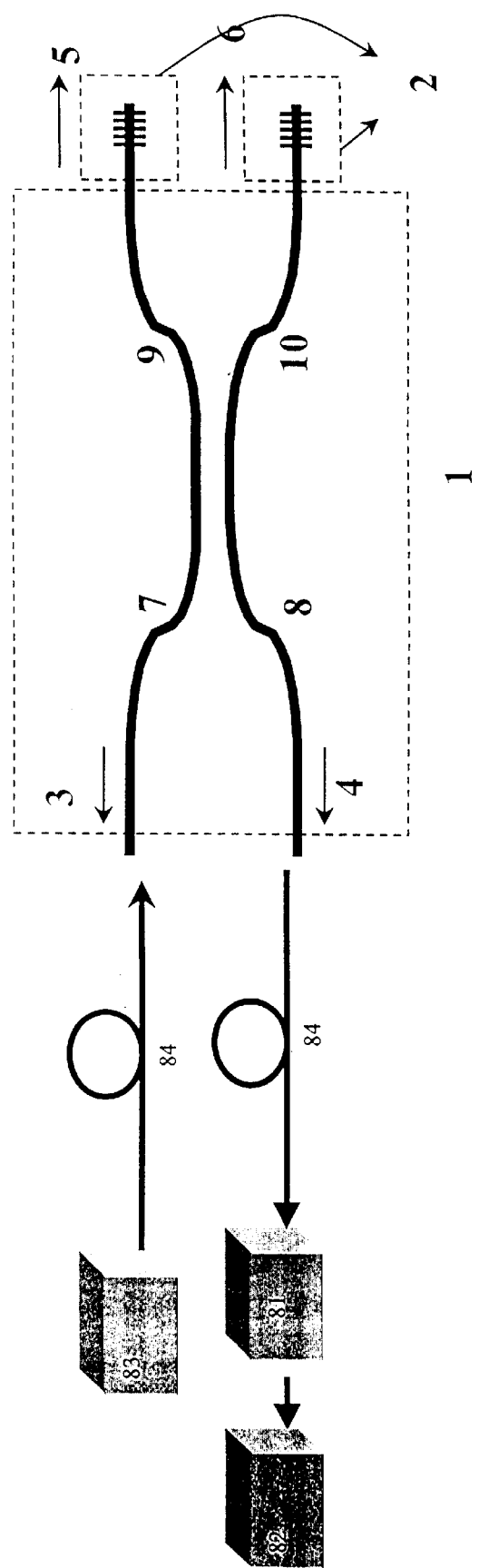
FIG. 1 shows schematically a silicon-on-insulator optical waveguide Michelson interferometer temperature sensor according to the present invention.

BRIEF DESCRIPTION OF THE REFERENCE NUMBERS 1 2×2 silicon-on-insulator optical waveguide coupler
2 silicon-on-insulator optical waveguide Bragg grating
3 reflective output electric field ($Er_1$) of port 1
4 reflective output electric field ($Er_2$) of port 2
5 reflective output electric field ($Er_3$) of port 3
6 reflective output electric field ($Er_4$) of port 4

7 input port length ($l_1$) of port 1
8 input port length ($l_2$) of port 2
9 output port length ($l_3$) of port 3
10 output port length ($l_4$) of port 4
81 optical power detector
82 microprocessor
83 laser
84 fiber
11 width of silicon-on-insulator optical waveguide
12 single mode ridge-type waveguide
13 single mode S-type ridge waveguide
14 single mode parallel-coupling waveguide
15 silicon guiding layer
16 silicon dioxide insulating layer
17 silicon substrate 21 amorphous silicon layer
22 sinusoidal grating in silicon layer
23 period of the grating
24 length of the grating

DESCRIPTION OF THE INVENTION

The present invention provides a Michelson interferometer temperature sensor by combining a 2×2 (two input ports and two output ports) silicon-on-insulator waveguide coupler 1 with two silicon-on-insulator waveguide Bragg gratings 2, as shown in FIG. 1.

Figure 2:
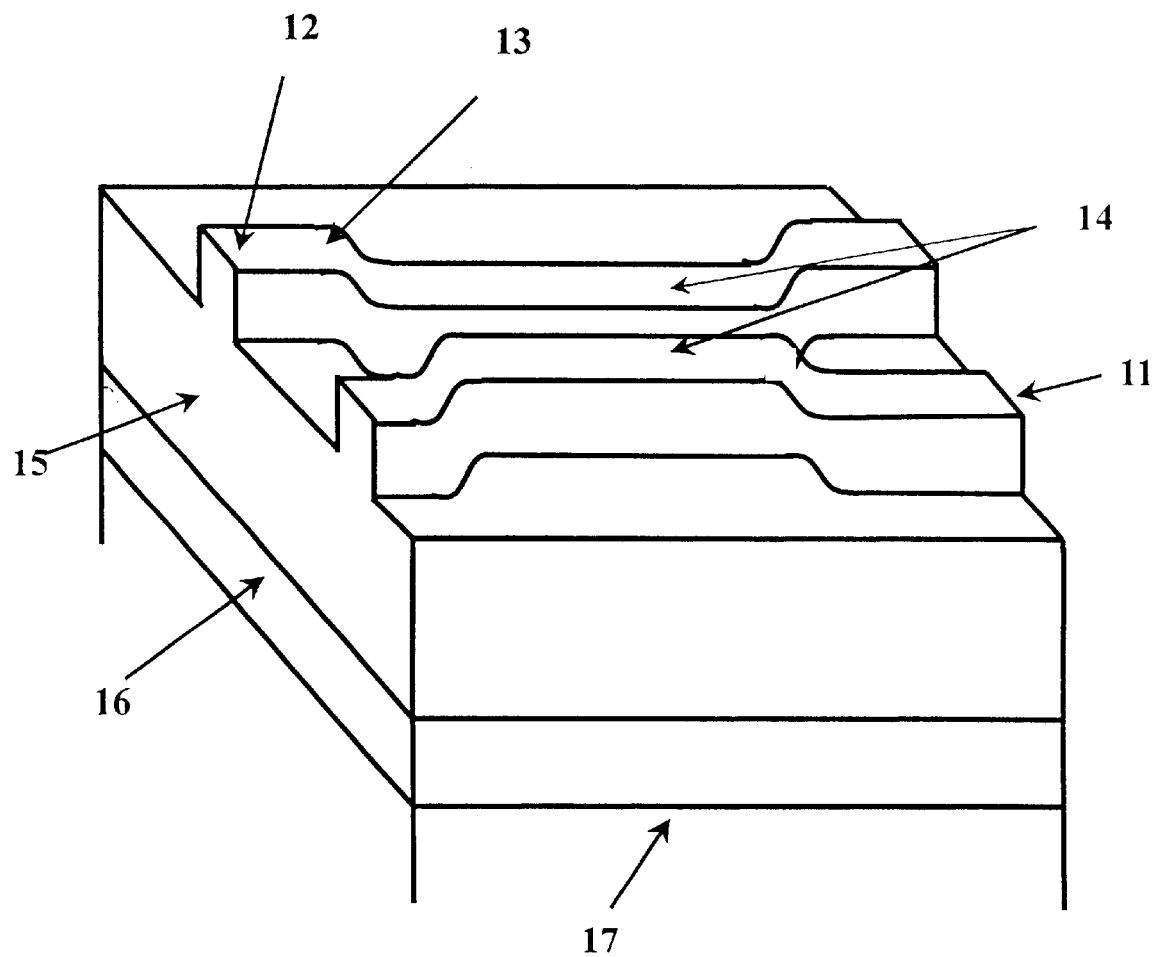
FIG. 2 shows schematically the structure of a 2×2 silicon-on-insulator optical waveguide coupler according to the present invention.

Silicon-on-insulator waveguide coupler 1 comprises a single mode ridge-type waveguide 12, a single mode S-type ridge waveguide 13, a single mode parallel-coupling waveguide 14, a silicon guiding layer 15, a silicon dioxide insulating layer 16 and a silicon substrate 17, as shown in FIG. 2

Figure 3:
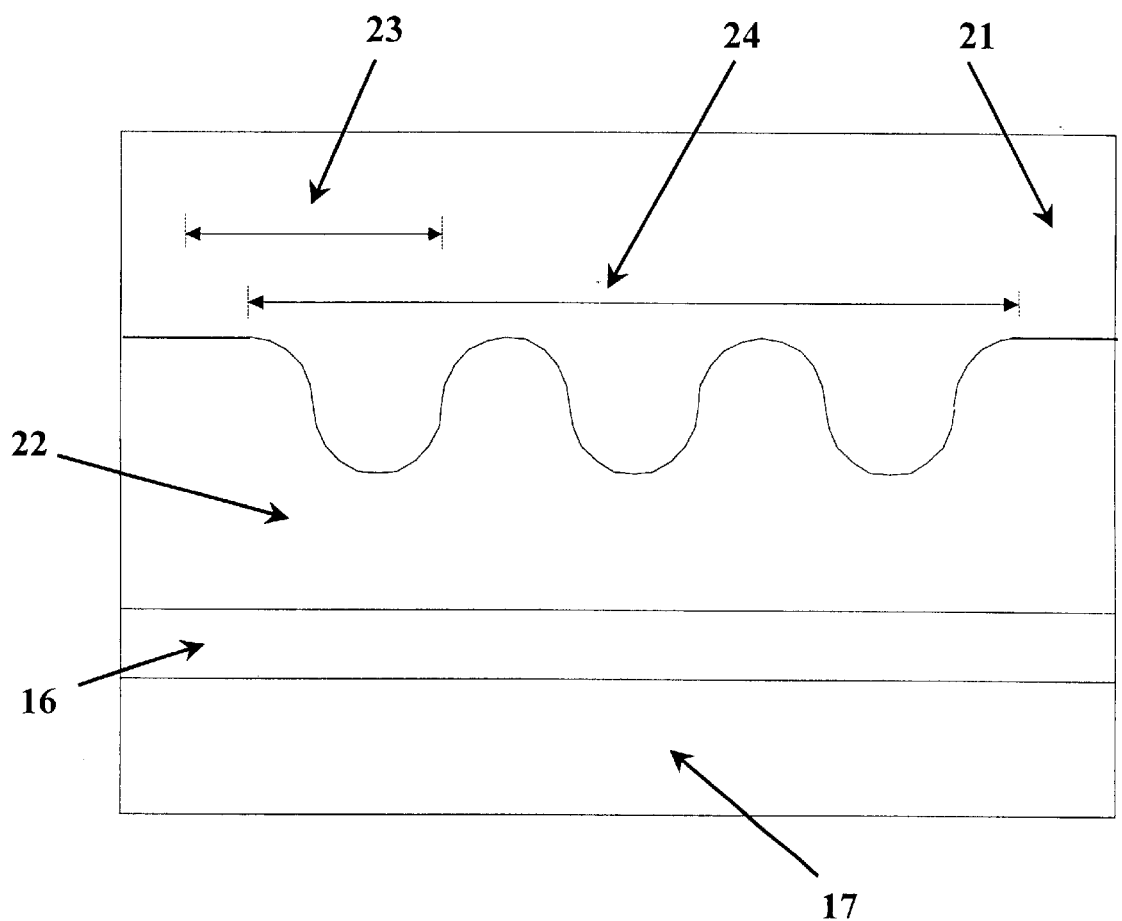
FIG. 3 shows schematically a side view of the silicon-on-insulator optical waveguide Bragg grating.

Silicon-on-insulator waveguide Bragg grating 2 comprises an amorphous silicon layer 21, a sinusoidal silicon grating layer 22, a silicon dioxide insulating layer 16 and a silicon substrate 17, as shown in FIG. 3.

Silicon-on-insulator waveguide coupler 1 and silicon-on-insulator waveguide Bragg grating 2 are both formed on silicon dioxide insulating layer 16 and silicon substrate 17, and are contacted with each other.

When a light of 1.55 μm wavelength is projected through the silicon guiding layer 15 of the single mode ridge-type waveguide 12, since the refraction index (nsi=3.5) of the silicon guiding layer 15 is higher than those of the air (nair=1 and the silicon dioxide insulating layer 16 (nsio2= 1.5), the light will be confined within the waveguide due to the effect of total reflection. Since the outer diameter of a conventional fiber is about 125 μm, the present invention designed a single mode S-type ridge waveguide 13 (as shown in FIG. 2), then let the distance between waveguides being larger than 125 μm, so as to connect the silicon-on-insulator waveguide coupler 1 and the fiber conveniently. When the light passes through the fiber, single mode ridge-type waveguide 12 and then enters the single mode parallel-coupling waveguide 14, the light will be coupled to another parallel single mode ridge-type waveguide 12 due to the weak coupling effect.

By the couple-mode equation, the present invention designed an optimal silicon-on-insulator waveguide Bragg grating having waveguide width 11 of 6 μm, sinusoidal silicon grating layer 22 of 1.5 μm, grating period 23 of 0.2215 μm, grating length 24 of 100 μm, silicon dioxide insulation layer 16 of 0.4 μm, and amorphous silicon layer 21 of 1 μm. By calculating of the couple-mode equations as shown below, the reflective optical power distribution presented by 1.55 μm light passing through the waveguide Bragg grating can be written as:

$$P_R = \frac{\left(\frac{\pi\Delta nf}{c}\right)^2 \sinh^2\left[\sqrt{\left(\frac{\pi\Delta nf}{c}\right)^2 - \left(\frac{2\pi nf}{c} - \frac{\pi}{\Lambda}\right)^2}\, L\right]}{\sqrt{\left(\frac{\pi\Delta nf}{c}\right)^2 - \left(\frac{2\pi nf}{c} - \frac{\pi}{\Lambda}\right)^2}\, \cosh^2\left[\sqrt{\left(\frac{\pi\Delta nf}{c}\right)^2 - \left(\frac{2\pi nf}{c} - \frac{\pi}{\Lambda}\right)^2}\, L\right] + \left(\frac{2\pi nf}{c} - \frac{\pi}{\Lambda}\right)^2 \sinh^2\left[\sqrt{\left(\frac{\pi\Delta nf}{c}\right)^2 - \left(\frac{2\pi nf}{c} - \frac{\pi}{\Lambda}\right)^2}\, L\right]} \quad (1)$$

in which c represents the light speed, f is the operating frequency for the grating, n is the refraction index, Δn is the refraction index difference between the grating layer and the covering layer.

When the thermal expansion property is considered into the waveguide Bragg grating, the relation between external temperature variation ΔT and the drift of the reflective optical spectrum $f_R$ is shown as below:

$$f_R = \frac{c}{[1 + (E + T_0)\Delta T] 2n\Lambda} \quad (2)$$

in which E is the thermal expansion coefficient (2.6×10$^{-6}$/° C.), $T_0$ is the thermal-optical coefficient (8.6×10$^{-4}$/° C.).

FIG. 1 shows schematically a silicon-on-insulator optical waveguide Michelson interferometer temperature sensor according to the present invention, in which the relation between the input electric field $E_{in}$ and output electric field $E_{ri}$ can be obtained by matrix algebra method as shown below:

$$E_{r1} = \frac{re^{-i\beta l_1}}{(1-K)}[Ke^{-2i\beta l_3} + (1-K)e^{-2i\beta l_4}]E_{in} \quad (3)$$

$$E_{r2} = \left[\frac{i\sqrt{K}}{\frac{K}{\sqrt{1-K}} + \sqrt{1-K}} r(e^{-2i\beta l_3} + e^{-2i\beta l_4})e^{-i\beta(l_1+l_2)}\right]E_{in} \quad (4)$$

in which K is the coupling constant of the 2×2 waveguide coupler, r is the reflectivity of the wave guide Bragg grating, β is the waveguide propagation constant, $l_i$ represents the length of one of the four input/output ports.

When equations (1) and (2) are substituted into the above-mentioned equations (3), (4), (5), (6) for simulation, the drift condition of the light passing through the waveguide Michelson Interferometer due to the environmental temperature can be obtained. The following embodiment describes the simulation result of the present invention.

Embodiment

In order to verify the feasibility of the present invention, a numerical analysis is employed to prove that the silicon-on-insulator optical waveguide Michelson interferometer temperature sensor according to the present invention can measure the environmental temperature. An optical light of 1.55 μm is considered to simulate the function and feature of the silicon-on-insulator optical waveguide Michelson interferometer temperature sensor.

Figure 4:
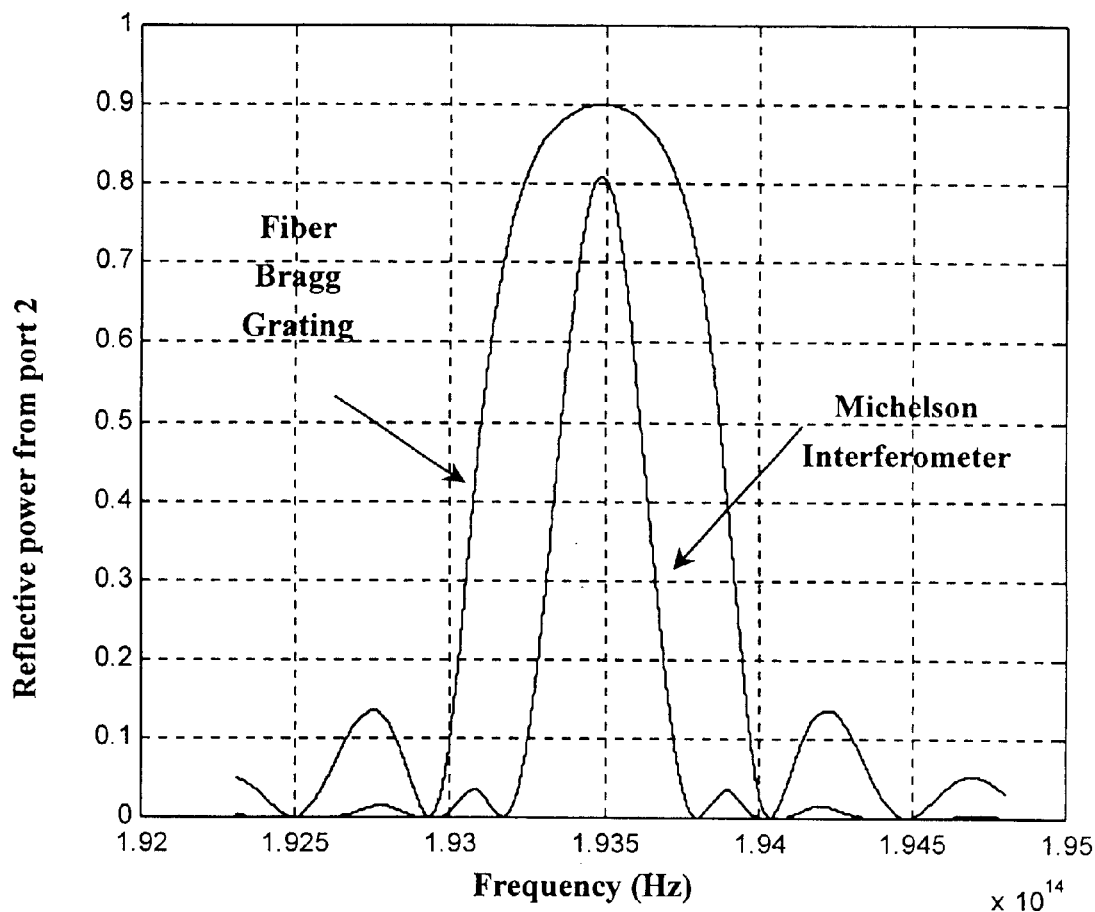
FIG. 4 shows a comparison of the reflective optical power spectrum between the SOI optical waveguide Michelson interferometer temperature sensor and the conventional fiber Bragg grating.

FIG. 4 shows a comparison of the reflective optical power spectrum between the SOI optical waveguide Michelson interferometer temperature sensor and the conventional fiber Bragg grating temperature sensor, using wavelength of 1.55 μm, grating period 23 of 0.2215 μm, grating length 24 of 100 μm. According to the comparison of the reflective optical power spectra shown in FIG. 4, it is found that the SOI optical waveguide Michelson interferometer temperature sensor of the present invention has a narrower reflective optical spectrum when adopting the same grating period, and therefore has a higher accuracy than that of the fiber grating temperature sensor.

Figure 5:
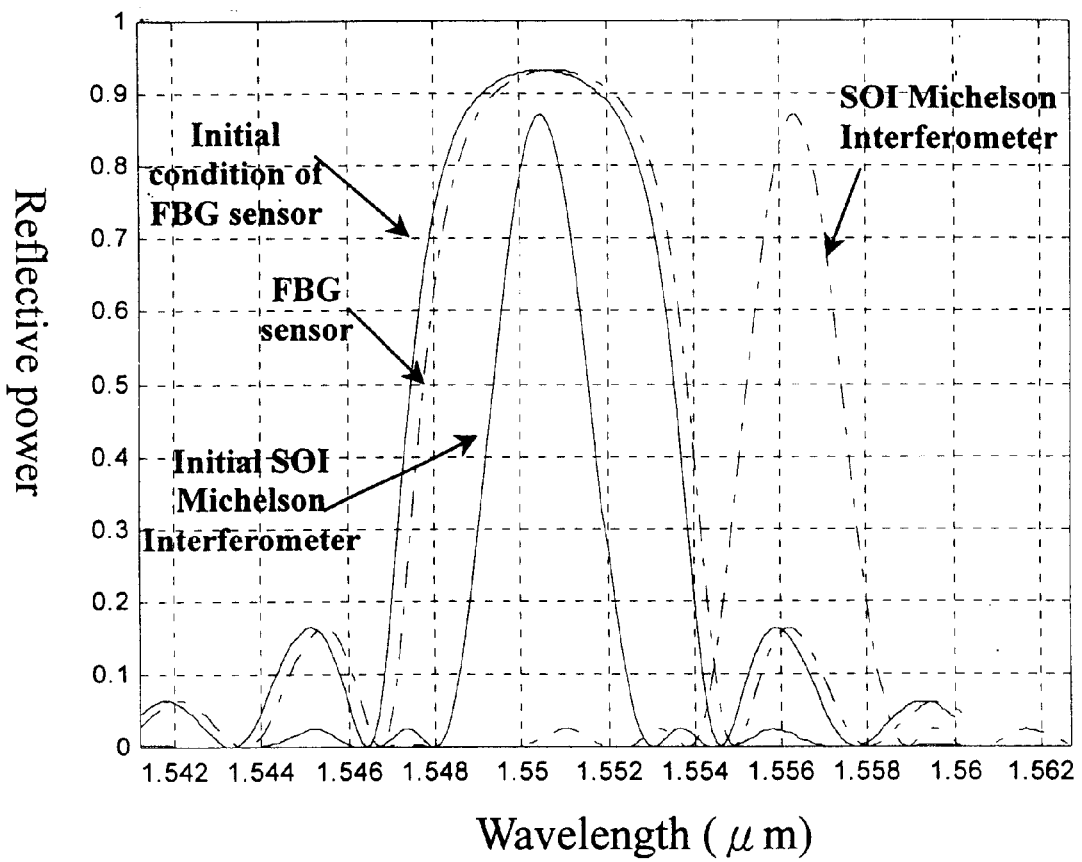
FIG. 5 shows a comparison of the rift of the reflective power spectrum induced by temperature variation between the SOI optical waveguide Michelson interferometer temperature sensor and the conventional fiber Bragg grating.

FIG. 5 shows a comparison of the drift of the reflective power spectrum by temperature variation of 10° C. between the SOI optical waveguide Michelson interferometer temperature sensor and the conventional fiber Bragg grating. By analyzing FIG. 5, it is found that the drift of the reflective power spectrum per 1° C. of the SOI optical waveguide Michelson interferometer temperature sensor is 20 times more than that of the conventional fiber Bragg grating temperature sensor. This result proves that the temperature sensing feature of the SOI optical waveguide Michelson interferometer temperature sensor is much more sensitive than that of the conventional fiber Bragg grating temperature sensor.

Features and Effects

The feature of the present invention is to combine the integrated circuit and the integrated optical sensor based on SOI substrate, and to reduce the size of an optical sensor, enhance the accuracy of temperature sensing by an SOI optical waveguide Michelson interferometer temperature sensor, therefore improve the effects of the temperature sensor. The effects of the SOI optical waveguide Michelson interferometer temperature sensor according to the present invention are as below:

1. Temperature sensing: can be used as an industrial sensor, a temperature controller for silicon IC wafer and a biomedical sensor.
2. High accuracy.
3. Narrow FWHM (Full Wavelength Half Maximum)
4. When it is used in optical communication network monitoring, the reliability of the network data transmission is enhanced.

What is claimed is:

1. A silicon-on-insulator optical waveguide Michelson interferometer temperature sensor, comprising a silicon-on-insulator waveguide coupler, two silicon-on-insulator waveguide Bragg gratings, an optical power detector, and a microprocessor;

said silicon-on-insulator waveguide coupler comprising a single mode ridge-type waveguide, a single mode S-type ridge waveguide, a single mode parallel-coupling waveguide, a silicon guiding layer, a silicon dioxide insulator layer and a silicon substrate;

said silicon-on-insulator waveguide Bragg grating comprising an amorphous silicon layer, a sinusoidal grating in the silicon layer, a silicon dioxide (SiO2) insulator layer and a silicon substrate, wherein said silicon dioxide insulator layer is covered by said sinusoidal grating in said silicon layer, and said sinusoidal grating in said silicon layer is covered by said amorphous silicon layer; and wherein when light passes through said silicon-on-insulator waveguide coupler, the light goes through the two Bragg gratings and is reflected to the waveguide coupler, and an interference spectrum is detected, the peak of the spectrum of the reflected light varying according to a temperature to be measured, whereby the temperature to be measured is obtained by using said optical power detector to detect said spectrum.

2. The temperature sensor according to claim 1, further comprising one of a laser, an LED and a light source of wide bandwidth.

3. A silicon-on-insulator optical waveguide Michelson interferometer temperature sensor, comprising an optical waveguide arranged to provide the function of light-splitting, two silicon-on-insulator waveguide Bragg gratings, an optical power detector, and a microprocessor;

said silicon-on-insulator waveguide Bragg grating comprising an amorphous silicon layer, a sinusoidal grating in the silicon layer, a silicon dioxide ($SiO_2$) insulator layer and a silicon substrate, wherein said silicon dioxide insulator layer is covered by said sinusoidal grating in said silicon layer, and said sinusoidal grating in said silicon layer is covered by said amorphous silicon layer; and wherein when light passes through said optical waveguide, the light goes through the two Bragg gratings and is reflected to the optical waveguide, and an interference spectrum is detected, the peak of the spectrum of the reflected light varying according to a temperature to be measured, whereby the temperature to be measured is obtained by using said optical power detector to detect said spectrum.

4. A silicon-on-insulator optical waveguide Michelson interferometer temperature sensor, comprising a multimode interference waveguide, two silicon-on-insulator waveguide Bragg gratings, an optical power detector, and a microprocessor;

said silicon-on-insulator waveguide Bragg grating comprising an amorphous silicon layer, a sinusoidal grating in the silicon layer, a silicon dioxide ($SiO_2$) insulator layer and a silicon substrate, wherein said silicon dioxide insulator layer is covered by said sinusoidal grating in said silicon layer, and said sinusoidal grating in said silicon layer is covered by said amorphous silicon layer; and wherein when light passes through said multimode interference waveguide, the light goes through the two Bragg gratings and is reflected to the multimode interference waveguide, and an interference spectrum is detected, the peak of the spectrum of the reflected light varying according to a temperature to be measured, whereby the temperature to be measured is obtained by using said optical power detector to detect said spectrum.

5. The temperature sensor according to claim 1, wherein an input port and an output port of the said silicon-on-insulator waveguide coupler is connected with tapered waveguides in order to be connected to input/output fibers or exterior optical paths.

6. The temperature sensor according to claim 1, wherein said silicon-on-insulator waveguide coupler has two input ports and two output ports, the lengths of said two output ports are $l_3$ and $l_4$, having a relation of $l_3-l_4=68$ μm○.

7. The temperature sensor according to claim 1, wherein the silicon material is replaced by GaAs, InP or glass.

8. The temperature sensor according to claim 1, wherein said amorphous silicon layer is replaced by another material of different expansion coefficient.

9. The temperature sensor according to claim 1, wherein said silicon-on-insulator waveguide Bragg grating has different grating pitchs and shapes.

10. The temperature sensor according to claim 1, wherein after said optical power detector and said microprocessor calculate the related wavelength, the data of the related wavelength wilt pass through a feed back circuit to stabilize the frequency of said laser.

* * * * *